United States Patent
Heishi et al.

(10) Patent No.: US 6,563,276 B2
(45) Date of Patent: May 13, 2003

(54) CRT DISPLAY APPARATUS

(75) Inventors: Akinori Heishi, Tokyo (JP); Hironobu Yasui, Tokyo (JP); Tetsuya Shimizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/989,418

(22) Filed: Nov. 21, 2001

(65) Prior Publication Data

US 2003/0001526 A1 Jan. 2, 2003

(30) Foreign Application Priority Data

Jul. 2, 2001 (JP) ........................................ 2001-200629

(51) Int. Cl.$^7$ ............................................. H01J 29/52
(52) U.S. Cl. ...................... 315/381; 315/383; 315/403; 315/368.11; 348/379; 348/380
(58) Field of Search ................ 315/368.11, 368.15, 315/368.18, 368.23, 381, 382, 382.1, 383, 403; 348/379, 380, 805, 806

(56) References Cited

U.S. PATENT DOCUMENTS 4,259,687 A * 3/1981 Shinkai et al. .............. 348/813
5,182,492 A * 1/1993 Chen .......................... 315/14
6,404,147 B1 * 6/2002 Shigematsu et al. ... 315/368.21

FOREIGN PATENT DOCUMENTS

JP          3-167965         7/1991

* cited by examiner

Primary Examiner—Haissa Philogene
(74) Attorney, Agent, or Firm—Birch, Stewart, Kolasch & Birch, LLP

(57) ABSTRACT

A CRT display apparatus capable of displaying images in high contrast and high brightness without causing noises and halftone-reproduction degradation within dark areas is disclosed. The apparatus includes a circuit for generating an R-control signal, a G-control signal and a B-control signal by removing, from each of the R-, G- and B-video signals, portions which are below a predetermined level in amplitude, an amplification circuit for inverting and amplifying the R-, G- and B-control signals, and a selection circuit for selecting, for each of the three G1 electrodes, either a corresponding one of the R-, G- and B-control signals inverted and amplified by the amplification circuit or a potential of a predetermined value in accordance with an instruction from an outside, and applying each of the three G1 electrodes with a selected one of the corresponding one of the R-, G- and B-control signals and the potential.

6 Claims, 10 Drawing Sheets

CRT DISPLAY APPARATUS

FIELD OF THE INVENTION

The present invention relates to a CRT display apparatus, particularly relates to a CRT display apparatus having a normal-contrast-display mode and a high-contrast-display mode.

BACKGROUND OF THE INVENTION

As described in Japanese Unexamined Patent Publication No. 3-167965, it is known to apply a video signal to not only a cathode but also a grid electrode within an electron gun of a CRT to display brighter images in a CRT display apparatus. FIG. 8 shows the structure of the video drive circuit of the CRT display apparatus disclosed in this Japanese Unexamined Patent Publication No. 3-167965.

In this figure, a video signal is input directly into a non-inverting amplifier 33 and an inverting amplifier 34 through an input terminal 34. The video signal of negative polarity output from the non-inverting amplifier 33 is amplified by a video output amplifier 35 while maintaining its polarity and thereafter applied to a cathode electrode 37 of a CRT 39. On the other hand, the video signal of positive polarity output from the inverting amplifier 34 is amplified by a video output amplifier 36 while maintaining its polarity and thereafter applied to a grid electrode 38 of the CRT 39. As described above, the CRT display apparatus attains high brightness display by applying video signals having different polarities to the cathode electrode and the grid electrode respectively.

FIG. 9 is a graph showing a relationship between an amplitude of an input video signal and a brightness of a screen in a display apparatus including a video drive circuit having a structure as described above and a CRT whose $\gamma$ value is 2.0. The x axis represents amplitude of an input signal and y axis represents brightness. In this graph, the brightness of the screen when an input video signal whose amplitude is at 100% is applied only to the cathode is defined as 100%. A curve C1 represents an amplitude-brightness characteristic when a video signal is applied only to the cathode, and a curve C2 represents an amplitude-brightness characteristic when the same video signal is applied to the cathode and the grid. It is apparent from this graph that, if the cathode and the grid are applied with the same video signal, the brightness is at 200% when the amplitude of this input video signal is at 100% which is twice the brightness (100%) in a case where only the cathode is applied with the video signal.

By using a video drive circuit having such a structure as described above, it is possible to double a maximum brightness. However, since the brightness increases for the whole range of the amplitude of an input video signal, a dark area corresponding to an input signal having an amplitude lower than 20% which is recognized to be at a gray level which is close to a black level if only the cathode is applied with an input video signal is not recognized to be at the gray level close to the black level if both of the cathode and the grid are applied with the input video signal because of increase of the brightness of this area. As a result, although the maximum brightness increases, the screen looks bleached as a whole, and accordingly the contrast is perceived to decline. Moreover, when the brightness of the dark area increases, noises within this area become conspicuous, whereby image quality is degraded.

To avoid the decline of contrast and the degradation of image quality due to the noises within the dark area, it has been proposed to shift a voltage (a video signal amplitude) applied to the grid by a predetermined value, for example, to shift the voltage applied to the grid to such an extent that the brightness of an area corresponding to an input video signal having a 15% amplitude when the cathode and the grid are applied with the same video signal (referred to as "cathode+grid drive" hereinafter) matches the brightness of the same area when only the cathode is applied with the video signal (referred to as "cathode drive" hereinafter).

In a graph of FIG. 10, a curve C3 represents an amplitude-brightness characteristic when only the cathode is applied with a video signal, a curve C4 represents an amplitude-brightness characteristic when both of the cathode and the grid are applied with the video signal, and a curve C5 represents an amplitude-brightness characteristic when both of the cathode and the grid are applied with the video signal and the voltage level of the grid is shifted (referred to as "cathode+grid+level-shift drive" hereinafter). In the graph of FIG. 10, input video signals are plotted within 0% to 30% amplitude range.

This graph shows that the brightness in the case of the cathode+grid+level-shift drive (C5) is about the same as the brightness in the case of the cathode drive (C3) so far as an input video signal is within the 10% to 20% amplitude range, however it falls below zero when the input video signal has an amplitude less than 7%. It means that the brightness of any area corresponding to an input video signal having 7% amplitude or less is all brought to the black level, which causes halftone-reproduction degradation.

As described above, the conventional video drive circuit which attains high-brightness display by applying a video signal to both of the cathode and the grid to increase the maximum brightness involves the problem of contrast decline due to brightness increase in the areas which are at the gray level and close to the black level and image quality degradation due to the noises in the dark areas. Even if the provision for shifting the level of the voltage applied to the grid is made to avoid such problems, it causes another problem of causing halftone-reproduction degradation in the dark areas.

Besides, since the conventional video drive circuit has two different signal lines for supplying an input video signal to the inverting amplifier and the non-inverting amplifier individually, stray capacitance due to wiring is large compared with the case of supplying an input video signal only to the non-inverting amplifier, and its frequency response is therefore degraded.

OBJECT AND SUMMARY OF THE INVENTION

A first object of the present invention, which has been made addressing the above-described problems, is to provide a CRT display apparatus capable of displaying images in high contrast and high brightness without causing noises and halftone-reproduction degradation within dark areas. A second object of the present invention is to equip the CRT display apparatus capable of displaying images in high contrast and high brightness with ability to suppress frequency response degradation due to the stray capacitance.

The first object of the invention is achieved by a first display apparatus including a CRT having three cathode electrodes which are applied with an R-video signal, a G-video signal and a B-video signal respectively, and three G1 electrodes provided for the three cathode electrodes comprising:

a control signal generation circuit for generating an R-control signal, a G-control signal and a B-control signal by removing, from each of the R-, G- and B-video signals, portions which are below a predetermined level in amplitude respectively;

a control signal amplification circuit for inverting and amplifying the R-, G- and B-control signals output from the control signal generation circuit; and a selection circuit for selecting, for each of the three G1 electrodes, either a corresponding one of the R-, G- and B-control signals inverted and amplified by the control signal amplification circuit or a potential of a predetermined value in accordance with an instruction from an outside, and applying each of the three G1 electrodes with a selected one of the corresponding one of the R-, G- and B-control signals and the potential.

In order to achieve the second object of the invention, the first display apparatus may further comprise a switch for connecting one end of a signal line the other end of which is connected to an input of the control signal generation circuit to an input terminal through which the R-, G- and B-control signals enter, the switch being opened while the selection circuit selects the potential and being closed while the selection circuit selects the R-, G- and B-control signals.

The first object is achieved also by a second display apparatus including a CRT having three cathode electrodes which are applied with an R-video signal, a G-video signal and a B-video signal respectively, and a common G1 electrode comprising:

a control signal generation circuit for generating a control signal by removing, from one of the R-, G- and B-video signals, portions which are below a predetermined level in amplitude;

a control signal amplification circuit for inverting and amplifying the control signal output from the control signal generation circuit; and a selection circuit for selecting either the control signal inverted and amplified by the control signal amplification circuit or a potential of a predetermined value in accordance with an instruction from an outside, and applying the G1 electrode with a selected one of the control signal and the potential.

In order to achieve the second object of the invention, the second display apparatus may further comprise a switch for connecting one end of a signal line the other end of which is connected to an input of the control signal generation circuit to an input terminal through which the one of the R-, G- and B-control signals enters, the switch being opened while the selection circuit selects the potential and being closed while the selection circuit selects the control signal inverted and amplified by the control signal amplification circuit.

The first object is achieved also by a third display apparatus including a CRT having three cathode electrodes which are applied with an R-video signal, a G-video signal and a B-video signal respectively, and a common G1 electrode comprising:

a luminance signal generation circuit for mixing the R-, G-, and B-video signals in a predetermined ratio to generate a luminance signal;

a control signal generation circuit for generating a control signal by removing, from the luminance signal output from the luminance signal generation circuit, portions which are below a predetermined level in amplitude;

a control signal amplification circuit for inverting and amplifying the control signal output from the control signal generation circuit; and a selection circuit for selecting either the control signal inverted and amplified by the control signal amplification circuit or a potential of a predetermined value in accordance with an instruction from an outside, and applying the G1 electrode with a selected one of the control signal and the potential.

In order to achieve the second object of the invention, the third display apparatus may further comprise a switch for connecting one end of each of signal lines the other end of each of which is connected to an input of the luminance signal generation circuit to an input terminal through which one of the R-, G- and B-control signals enters, the switch being opened while the selection circuit selects the potential and being closed while selection circuit selects the control signal inverted and amplified by the control signal amplification circuit.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
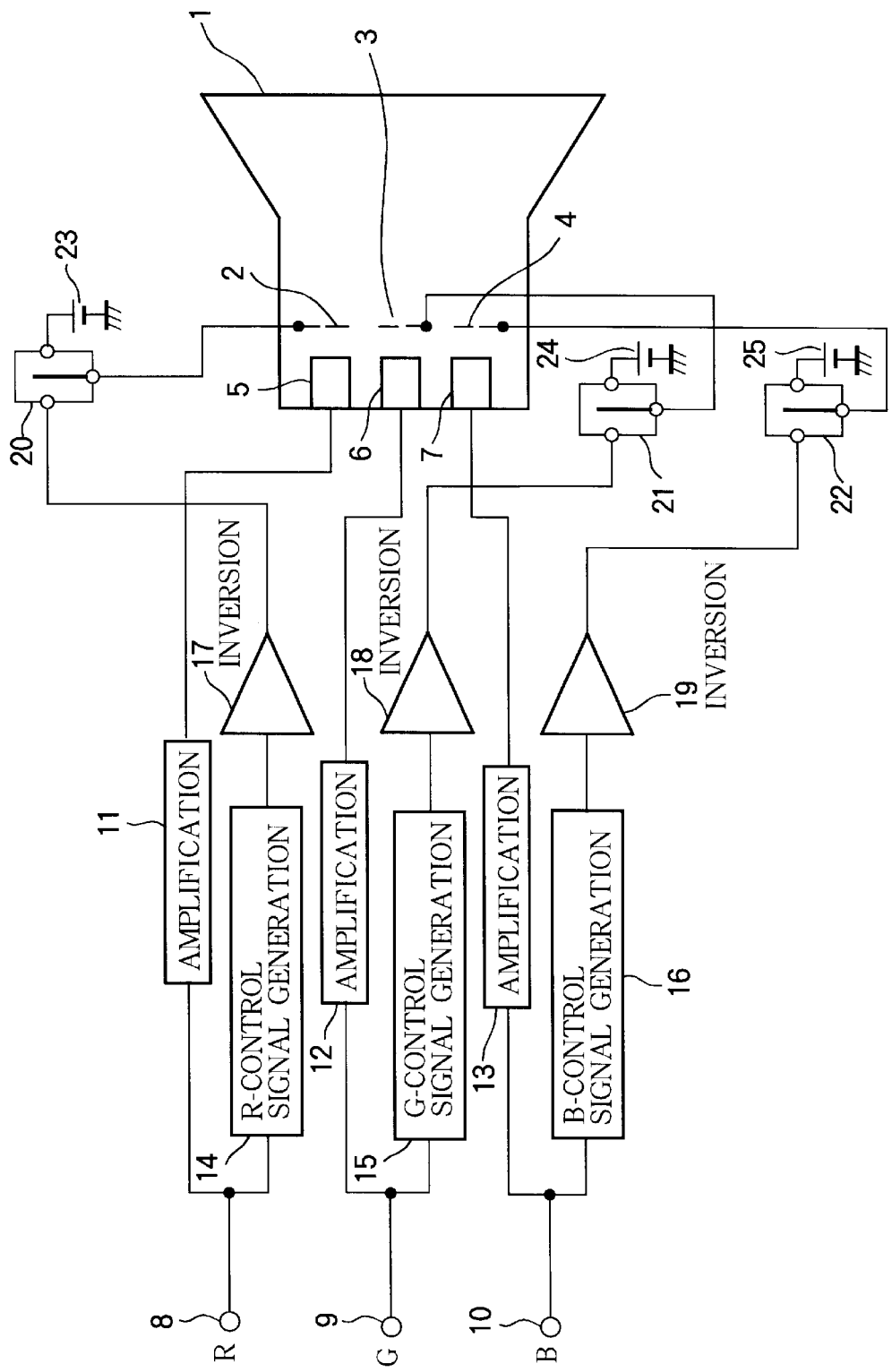
FIG. 1 is a block diagram showing a structure of a CRT display apparatus according to a first example of the invention.

FIG. 1 is a block diagram showing a structure of a CRT display apparatus according to a first example of the invention. The display apparatus according to the first example of the invention includes a CRT 1 with three cathodes for an R (Red)-beam, a G (Green)-beam and a B (Blue)-beam and three G1 electrodes (first grid electrodes) provided separately for the R-, G-, and B-beams. 2 denotes an R-beamready G1 electrode, 3 denotes a G-beam-ready G1 electrode, and 4 denotes a B-beam-ready G1 electrode. 5 denotes an R-cathode electrode, 6 denotes a G-cathode electrode, and 7 denotes a B-cathode electrode. The CRT 1 also includes a G2 electrode (a second grid electrode), a G3 electrode (a third grid electrode), etc. for control of intensity or focus of electron beams emitted from the cathodes other than the G1 electrodes, though they are not illustrated to simplify explanation.

As shown in FIG. 1, an R-signal input terminal 8 is connected to an input of an R-output amplification circuit 11, and an output of the R-output amplification circuit 11 is connected to the R-cathode electrode 5. The R-signal input terminal 8 is also connected to an input of an R-control signal generation circuit 14. An output of the R-control signal generation circuit 14 is connected to an input of an R-control signal amplification circuit 17, and an output of the R-control signal amplification circuit 17 is connected to a first input terminal of an R-contrast selection circuit 20. A second input terminal of the R-contrast selection circuit 20 is connected to an R-normal-contrast effecting potential 23. An output terminal of the R-contrast selection circuit 20 is connected to the R-beam-ready G1 electrode 2.

A G-signal input terminal 9 is connected to an input of a G-output amplification circuit 12, and an output of the G-output amplification circuit 12 is connected to the G-cathode electrode 6. The G-signal input terminal 9 is also connected to an input of a G-control signal generation circuit 15. An output of the G-control signal generation circuit 15 is connected to an input of a G-control signal amplification circuit 18, and an output of the G-control signal amplification circuit 18 is connected to a first input terminal of a G-contrast selection circuit 21. A second input terminal of the G-contrast selection circuit 21 is connected to a G-normal-contrast effecting potential 24. An output terminal of the G-contrast selection circuit 21 is connected to the G-beam-ready G1 electrode 3.

A B-signal input terminal 10 is connected to an input of a B-output amplification circuit 13, and an output of the B-output amplification circuit 13 is connected to the B-cathode electrode 7. The B-signal input terminal 10 is also connected to an input of a B-control signal generation circuit 16. An output of the B-control signal generation circuit 16 is connected to an input of a B-control signal amplification circuit 19, and an output of the B-control signal amplification circuit 19 is connected to a first input terminal of a B-contrast selection circuit 22. A second input terminal of the B-contrast selection circuit 22 is connected to a B-normal-contrast effecting potential 25. An output terminal of the B-contrast selection circuit 22 is connected to the B-beam-ready G1 electrode 4.

The operation of the first example of the invention having the above-described structure will now be described for the G-signal. The operations for the R- and G-beams are the same as the G-beam. The G-signal entering the G-output amplification circuit 12 through the G-signal input terminal 9 is amplified, and then supplied to the G-cathode electrode 6. The G-signal from the G-signal input terminal 9 also enters the G-control signal generation circuit 15. Here, suppose that the waveform of the G-signal supplied to the G-cathode electrode is as shown in FIG. 2(A). A maximum value of the amplitude of the waveform in this figure corresponds to the previously described 100% amplitude. The G-control signal generation circuit 15 generates a G-control signal as shown in FIG. 2(B) by removing, from the G-signal, portions which are below a predetermined level (below 15% of the maximum amplitude, for example).

Figure 2:
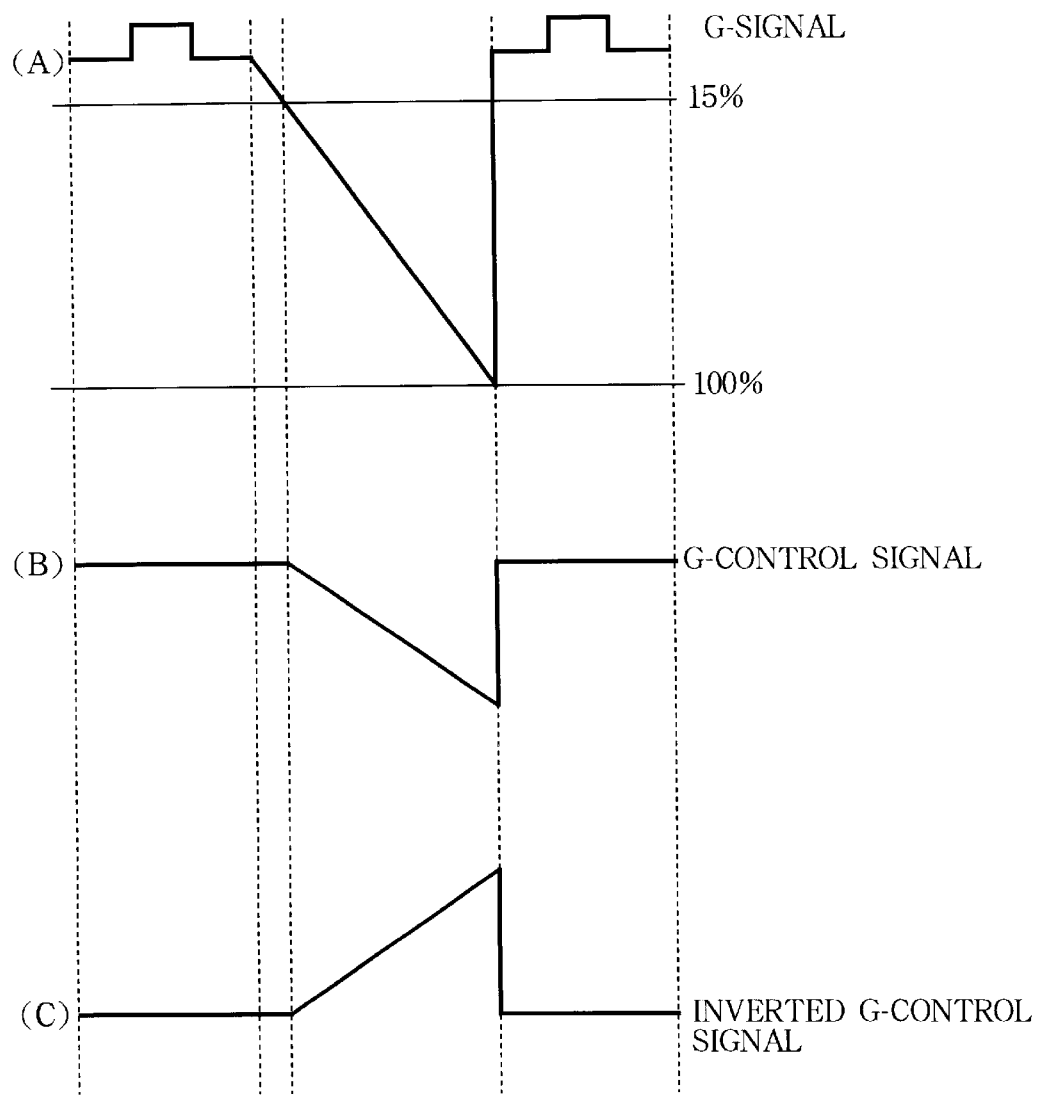
FIG. 2 is a view showing waveforms of a signal input to the G-cathode electrode, a signal output from the G-control signal generation circuit, and a signal output from the G-control signal amplification circuit in the CRT display apparatus according to the first example of the invention.

This G-control signal is inverted and amplified by the G-control signal amplification circuit 18 to become a signal as shown in FIG. 2 (C), and then input into the first input terminal of the G-contrast selection circuit 21.

Figure 10:
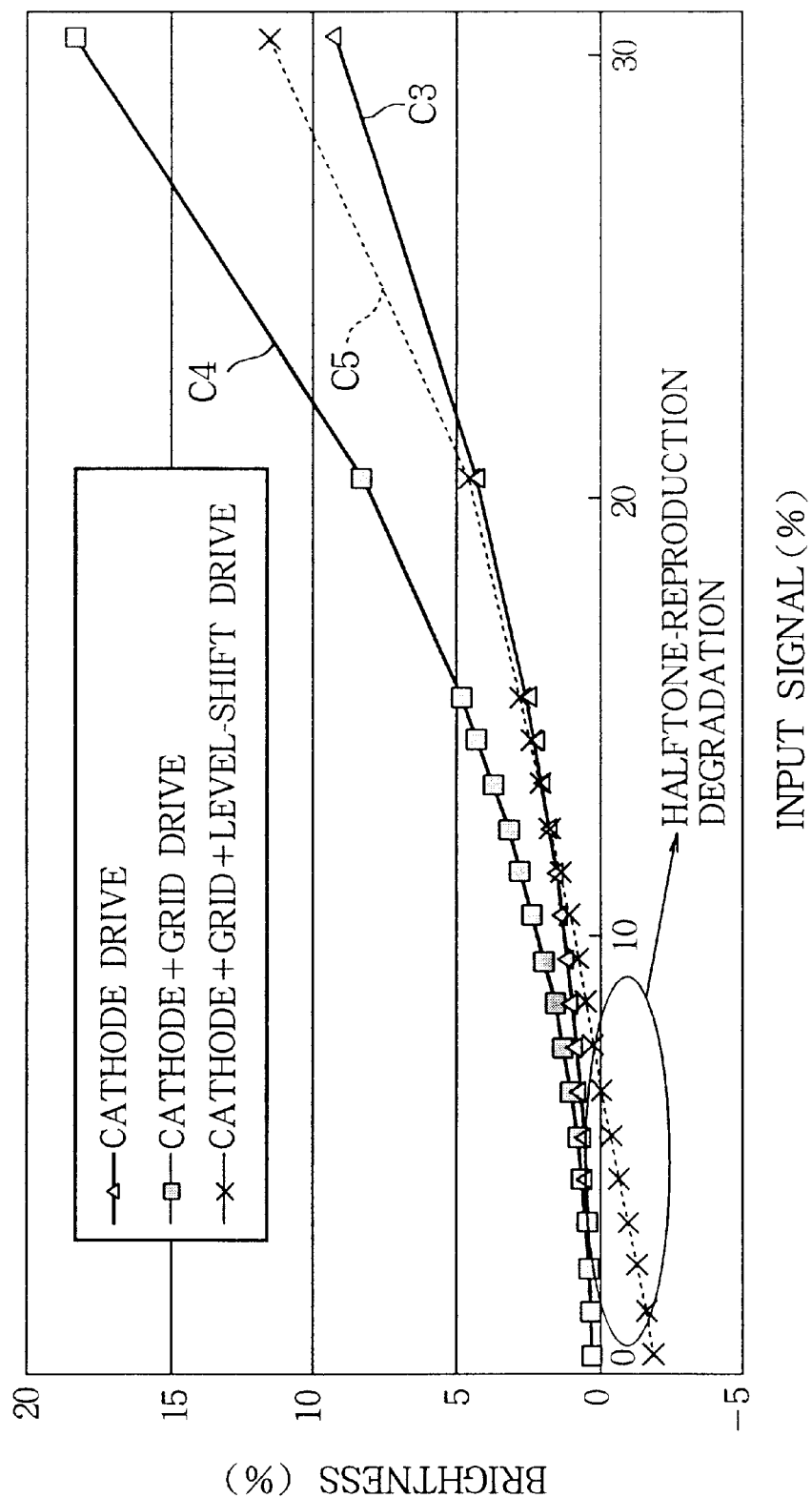
FIG. 10 is a graph explaining variation of an input signal amplitude-brightness characteristic of the CRT display apparatus with the video circuit of FIG. 8 when its grid voltage is shifted.

While the normal-contrast-display mode is selected, the G-contrast selection circuit 21 selects the second input terminal so that the G-beam-ready G1 electrode 3 is applied with the G-normal-contrast effecting potential 24. The input signal amplitude-brightness characteristic at this time is as shown by the curve C3 (the characteristic when only the cathode is applied with the video signal) in FIG. 10. Since the brightness is normalized, the input signal amplitude-brightness characteristics for the R-, G-, and B-signals can be represented by the same curve.

Figure 3:
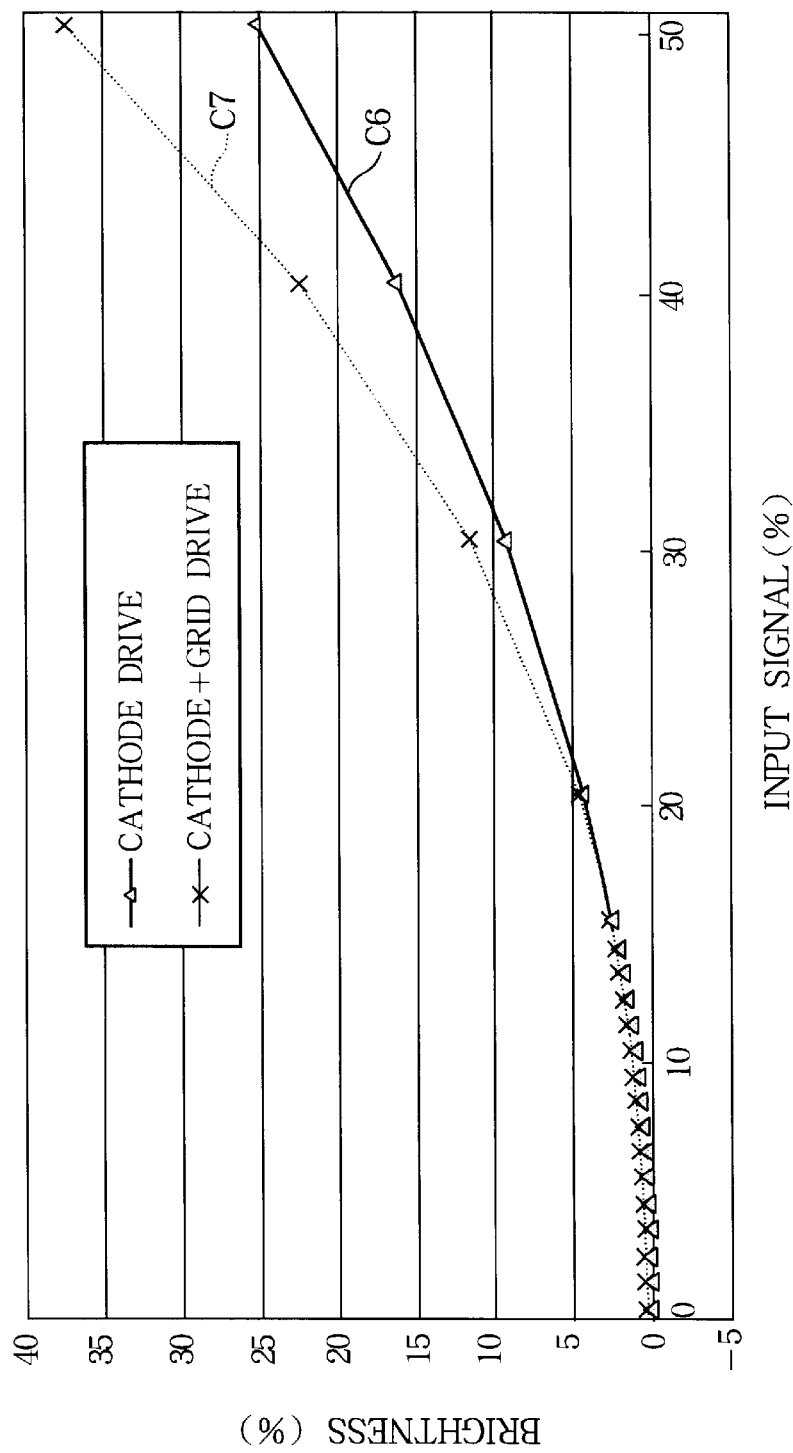
FIG. 3 is a graph showing an input signal amplitude-brightness characteristic of the CRT display apparatus according to the first example of the invention.

On the other hand, while the high-contrast-display mode is selected, the G-contrast selection circuit 21 selects the first input terminal so that the G-beam-ready G1 electrode 3 is applied with the output of the G-control signal amplification circuit 18. The input signal amplitude-brightness characteristic at this time is as shown by the curve C7 in FIG. 3. In FIG. 3, input video signals are plotted within 0% to 50% amplitude range. This characteristic matches the input signal amplitude-brightness characteristic in the normal-contrast-display mode represented by the curve C6 so far as the input video signal has an amplitude less than 15%. Accordingly, the brightness of the screen in the high-contrast-display mode is about the same as that in the normal-contrast-display mode for any dark area where the amplitude of the input video signal is less than 20%, and therefore, the halftone-reproduction degradation does not occur. On the other hand, the brightness in the high-contrast-display mode is larger than in the normal-contrast-display mode for any area where the amplitude of the input video signal is more than 20%.

Accordingly, with the CRT display apparatus according to the first example, it is possible to display images in high contrast and high brightness without causing noises or halftone-reproduction degradation within dark areas. Although the first example of the invention has three separate potentials of the R-normal-contrast effecting potential 23, the G-normal-contrast effecting potential 24, and the B-normal-contrast effecting potential 25, they can be the same potential, an earth potential, for example.

Figure 4:
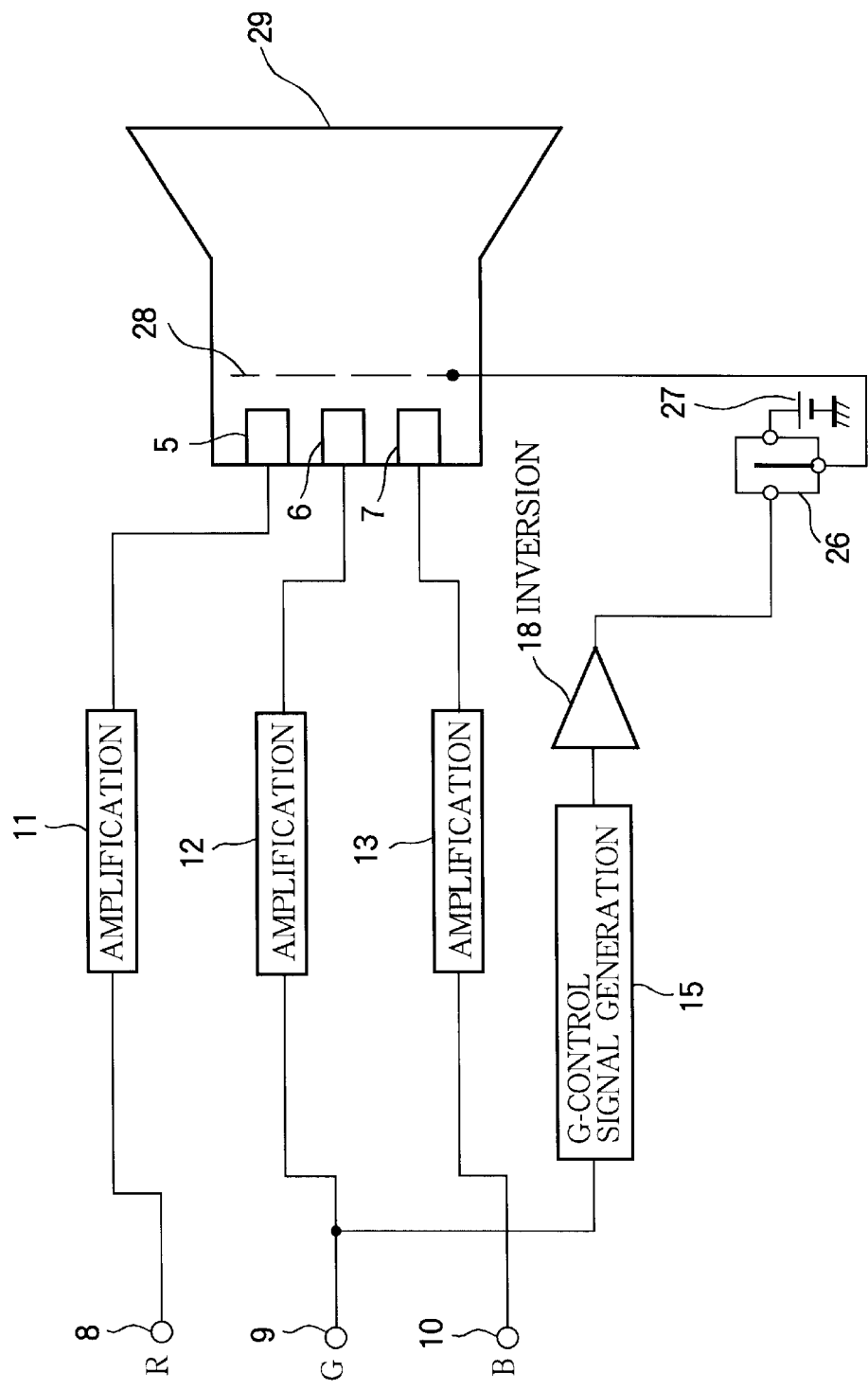
FIG. 4 is a block diagram showing a structure of a CRT display apparatus according to a second example of the invention.

FIG. 4 is a block diagram showing a structure of a CRT display apparatus according to a second example of the invention. In FIG. 4, the reference numerals identical to those in FIG. 1 represent the same or corresponding elements. The display apparatus according to the second example of the invention has a CRT 29 with three cathode electrodes 5, 6, and 7 provided for the R-, G-, and B-beams and one G1 electrode provided for the R-, G-, and B-beams in common. The CRT 29 also includes a G2 electrode (a second grid electrode), a G3 electrode (a third grid electrode), etc. for control of intensity or focus of electron beams emitted from the cathodes other than the G1 electrode, though they are not illustrated to simplify explanation.

As shown in FIG. 4, an R-signal input terminal 8 is connected to an input of an R-output amplification circuit 11, and an output of the R-output amplification circuit 11 is connected to the R-cathode electrode 5. A G-signal input terminal 9 is connected to an input of a G-output amplification circuit 12, and an output of the G-output amplification circuit 12 is connected to the G-cathode electrode 6. A B-signal input terminal 10 is connected to an input of a B-output amplification circuit 13, and an output of the B-output amplification circuit 13 is connected to the B-cathode electrode 7.

The G-signal input terminal 9 is also connected to an input of a G-control signal generation circuit 15. An output of the G-control signal generation circuit 15 is connected to an input of a G-control signal amplification circuit 18, and an output of the G-control signal amplification circuit 18 is connected to a first input terminal of a contrast selection circuit 26. A second input terminal of the contrast selection circuit 26 is connected to a normal-contrast effecting potential 27. An output terminal of the contrast selection circuit 26 is connected to the G1 electrode 28.

The operation of the second example of the invention having the above-described structure will now be described. The R-signal entering the R-output amplification circuit 11 through the R-signal input terminal 8 is amplified, and then supplied to the R-cathode electrode 5. The G-signal entering the G-output amplification circuit 12 through the G-signal input terminal 9 is amplified, and then supplied to the G-cathode electrode 6. The B-signal entering the B-output amplification circuit 13 through the B-signal input terminal 10 is amplified, and then supplied to the B-cathode electrode 7. The G-signal from the G-signal input terminal 9 also enters the G-control signal generation circuit 15.

Here, suppose that the waveform of the G-signal supplied to the G-cathode electrode 6 is as shown in FIG. 2(A). A maximum value of the amplitude of the waveform in this figure corresponds to the previously described 100% amplitude. The G-control signal generation circuit 15 generates a G-control signal as shown in FIG. 2(B) by removing, from the G-signal, portions which are below a predetermined level (below 15% of the maximum amplitude, for example). This G-control signal is inverted and amplified by the G-control signal amplification circuit 18 to become a signal as shown in FIG. 2(C), and then input into the first input terminal of the contrast selection circuit 26.

While the normal-contrast-display mode is selected, the contrast selection circuit 26 selects the second input terminal so that the G1 electrode 28 is applied with the normal-contrast effecting potential 27. The input signal amplitude-brightness characteristic at this time is as shown by the curve C3 (the characteristic when only the cathode is applied with the video signal) in FIG. 10. Since the brightness is normalized, the input signal amplitude-brightness characteristics for the R-, G-, and B-signals can be represented by the same curve.

On the other hand, while the high-contrast-display mode is selected, the contrast selection circuit 26 selects the first input terminal so that the G1 electrode 28 is applied with the output of the control signal amplification circuit 18. The input signal amplitude-brightness characteristic at this time is as shown by the curve C7 in FIG. 3. As explained previously, this characteristic matches the input signal amplitude-brightness characteristic in the normal-contrast-display mode represented by the curve C6 so far as the input video signal has an amplitude less than 15%. Accordingly, the brightness of the screen in the high-contrast-display mode is about the same as that in the normal-contrast-display mode for any dark area where the amplitude of the input video signal is less than 20%, and therefore, the halftone-reproduction degradation does not occur. On the other hand, the brightness in the high-contrast-display mode is larger than in the normal-contrast-display mode for any area where the amplitude of the input video signal is more than 20%.

Accordingly, with the CRT display apparatus according to the second example, it is possible to display images in high contrast and high brightness without causing noises or halftone-reproduction degradation within dark areas. Although the second example of the invention is configured such that the first input of the contrast selection circuit 26 is supplied with a signal obtained by passing the G-signal entering at the G-signal input terminal 9 through the G-control signal generation circuit 15 and the G-control signal amplification circuit 18, it is permissible to supply the first input of the contrast selection circuit 26 with a signal obtained by passing the R-signal entering at the R-signal input terminal 8 through the R-control signal generation circuit 14 and the R-control signal amplification circuit 17, or a signal obtained by passing the B-signal entering at the B-signal input terminal 10 through the B-control signal generation circuit 16 and the B-control signal amplification circuit 19.

Figure 5:
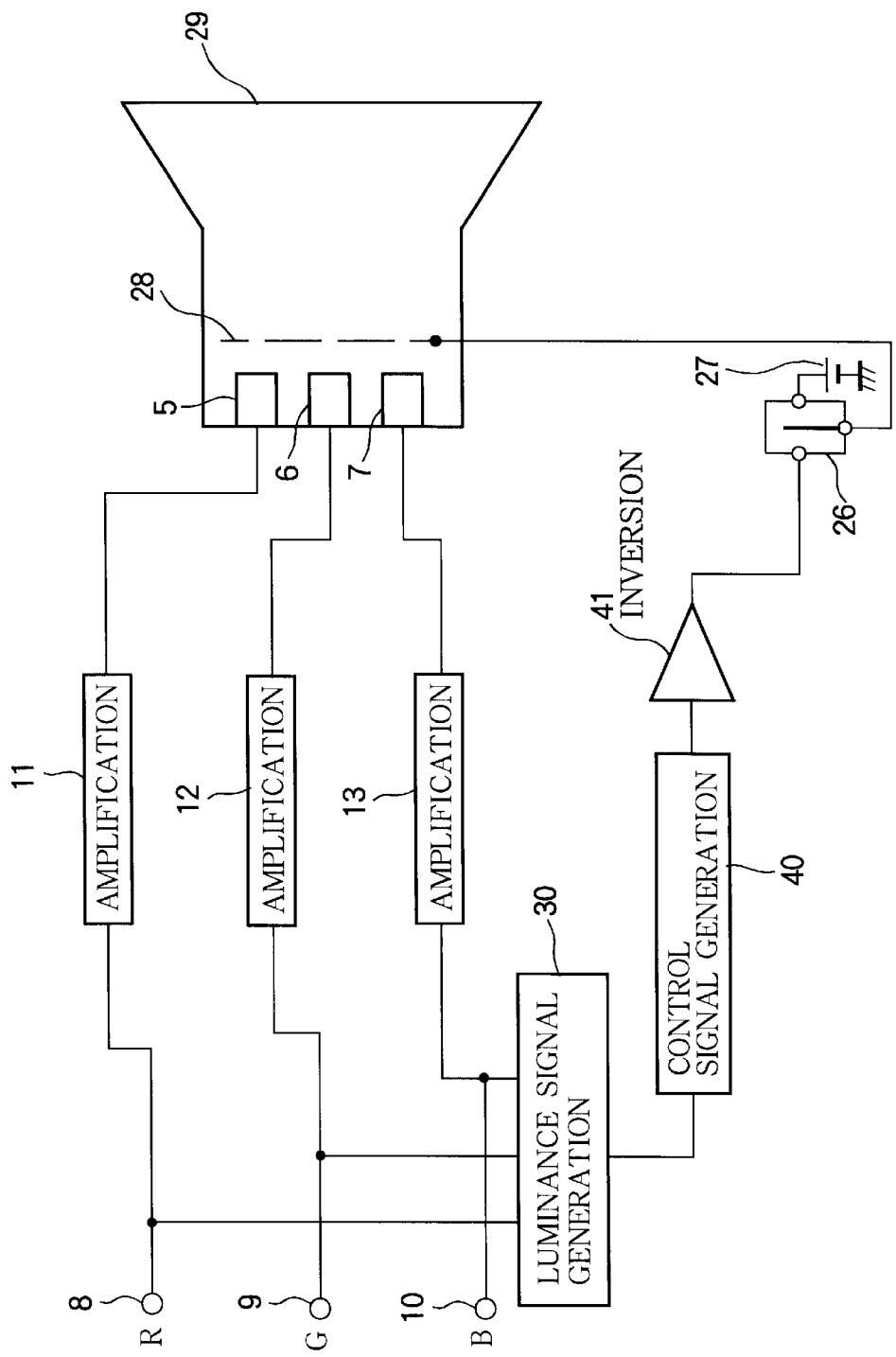
FIG. 5 is a block diagram showing a structure of a CRT display apparatus according to a third example of the invention.

FIG. 5 is a block diagram showing a structure of a CRT display apparatus according to a third example of the invention. In FIG. 5, the reference numerals identical to those in FIG. 1 or 4 represent the same or corresponding elements. The display apparatus according to the third example of the invention, as well as the display apparatus according to the second example, includes a CRT 29 with three cathode electrodes 5, 6, and 7 provided for the R-, G-, and B-beams and one G1 electrode provided for the R-, G-, and B-beams in common.

As shown in FIG. 5, an R-signal input terminal 8 is connected to an input of an R-output amplification circuit 11, and an output of the R-output amplification circuit 11 is connected to the R-cathode electrode 5. A G-signal input terminal 9 is connected to an input of a G-output amplification circuit 12, and an output of the G-output amplification circuit 12 is connected to the G-cathode electrode 6. AB-signal input terminal 10 is connected to an input of a B-output amplification circuit 13, and an output of the B-output amplification circuit 13 is connected to the B-cathode electrode 7.

The R-signal input terminal 8, the G-signal input terminal 9, and the B-signal input terminal 10 are also connected to an input of a luminance signal generation circuit 30. An output of the luminance signal generation circuit 30 is connected to an input of a control signal generation circuit 40. An output of the control signal generation circuit 40 is connected to an input of a control signal amplification circuit 41, and an output of the control signal amplification circuit 41 is connected to a first input terminal of a contrast selection circuit 26. A second input terminal of the contrast selection circuit 26 is connected to a normal-contrast effecting potential 27. An output terminal of the contrast selection circuit 26 is connected to the G1 electrode 28.

The operation of the display apparatus according to the third example of the invention having the above-described structure will now be explained. The R-signal entering the R-output amplification circuit 11 through the R-signal input terminal 8 is amplified, and then supplied to the R-cathode electrode 5. The G-signal entering the G-output amplification circuit 12 through the G-signal input terminal 9 is amplified, and then supplied to the G-cathode electrode 6. The B-signal entering the B-output amplification circuit 13 through the B-signal input terminal 10 is amplified, and then supplied to the B-cathode electrode 7.

Figure 6:
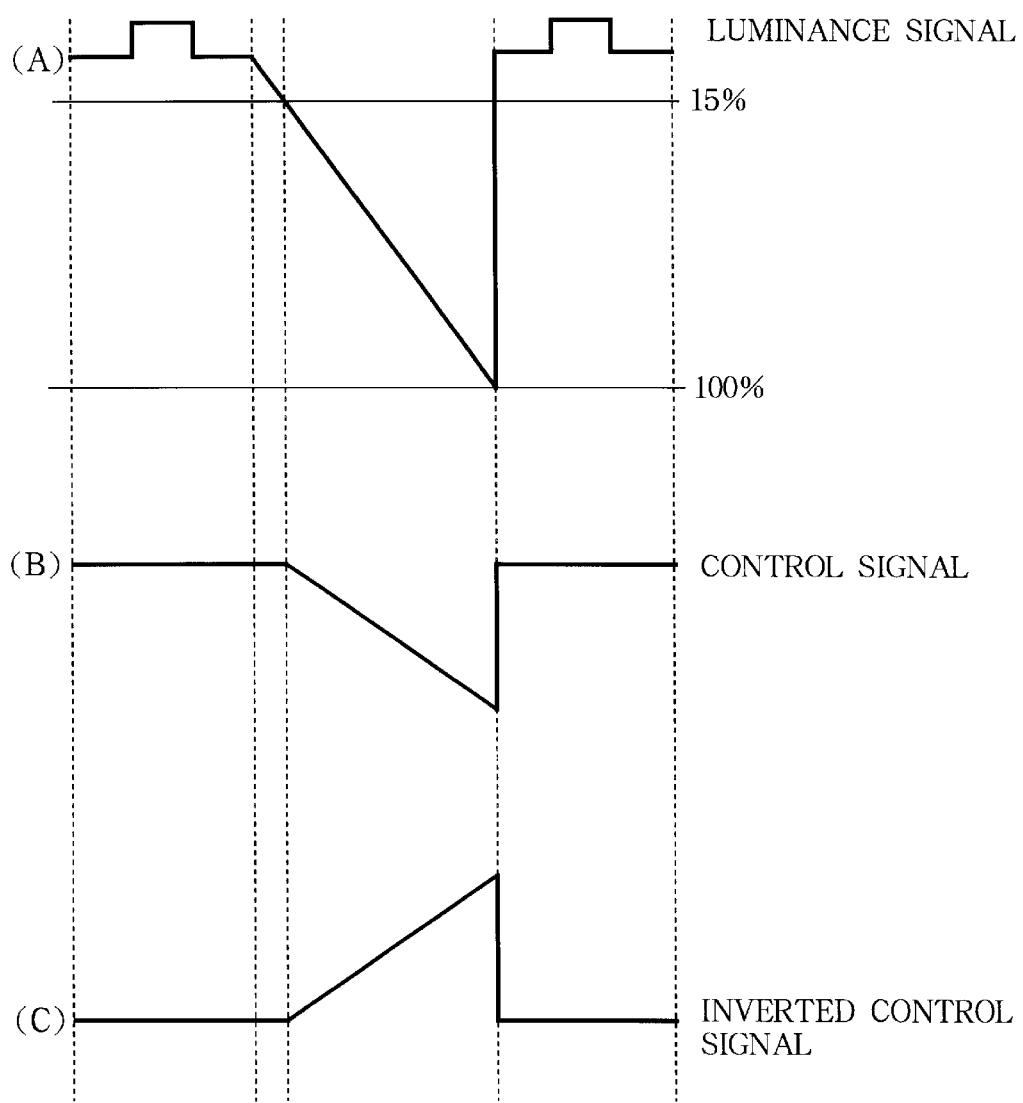
FIG. 6 is a view showing waveforms of a luminance signal, a signal output from the control signal generation circuit, and a signal output from the control signal amplification circuit in the CRT display apparatus according to the third example of the invention.

On the other hand, the R-, G-, and B-signals also enter the luminance signal generation circuit 30. The luminance signal generation circuit 30 generates a luminance signal by mixing the R-, G-, and B-signals in the ratio of the form 0.299R+0.587G+0.114B. Here, suppose that the waveform of the generated luminance signal is as shown in FIG. 6(A). The control signal generation circuit 40 generates a control signal as shown in FIG. 6(B) by removing, from this luminance signal, portions which are below a predetermined level (below 15% of the maximum amplitude, for example). The control signal amplification circuit 41 inverts and amplifies this control signal to produce a signal as shown in FIG. 6(C). This signal is input into the first input terminal of the contrast selection circuit 26.

While the normal-contrast-display mode is selected, the contrast selection circuit 26 selects the second input terminal so that the G1 electrode 28 is applied with the normal-contrast effecting potential 27. The input signal amplitude-brightness characteristic at this time is as shown by the curve C3 (the characteristic when only the cathode is applied with the video signal) in FIG. 10. Since the brightness is normalized, the input signal amplitude-brightness characteristics for the R-, G-, and B-signals can be represented by the same curve.

On the other hand, while the high-contrast-display mode is selected, the contrast selection circuit 26 selects the first input terminal so that the G1 electrode 28 is applied with the output of the control signal amplification circuit 41. The input signal amplitude-brightness characteristic at this time is as shown by the curve C7 in FIG. 3. As explained previously, this characteristic matches the input signal amplitude-brightness characteristic in the normal-contrast-display mode represented by the curve C6 so far as the input video signal has an amplitude less than 15%. Accordingly, the brightness of the screen in the high-contrast-display mode is about the same as that in the normal-contrast-display mode for any dark area where the amplitude of the input video signal is less than 20%, and therefore, the halftone-reproduction degradation does not occur. On the other hand, the brightness in the high-contrast-display mode is larger than in the normal-contrast-display mode for any area where the amplitude of the input video signal is more than 20%. Accordingly, with the CRT display apparatus according to the third example, it is possible to display images in high contrast and high brightness without causing noises or halftone-reproduction degradation within dark areas.

Figure 7:
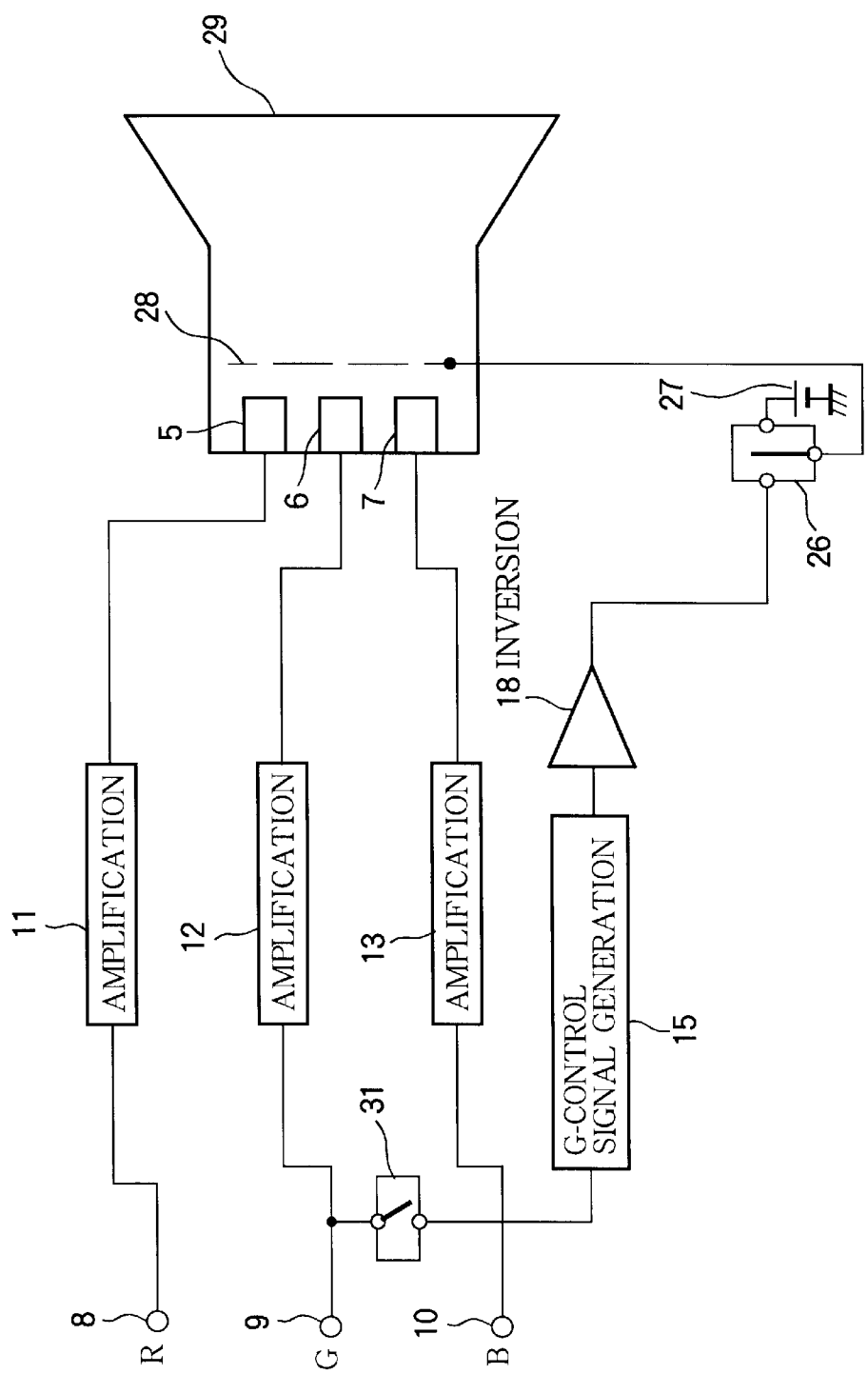
FIG. 7 is a block diagram showing a structure of a CRT display apparatus according to a fourth example of the invention.
Figure 8:
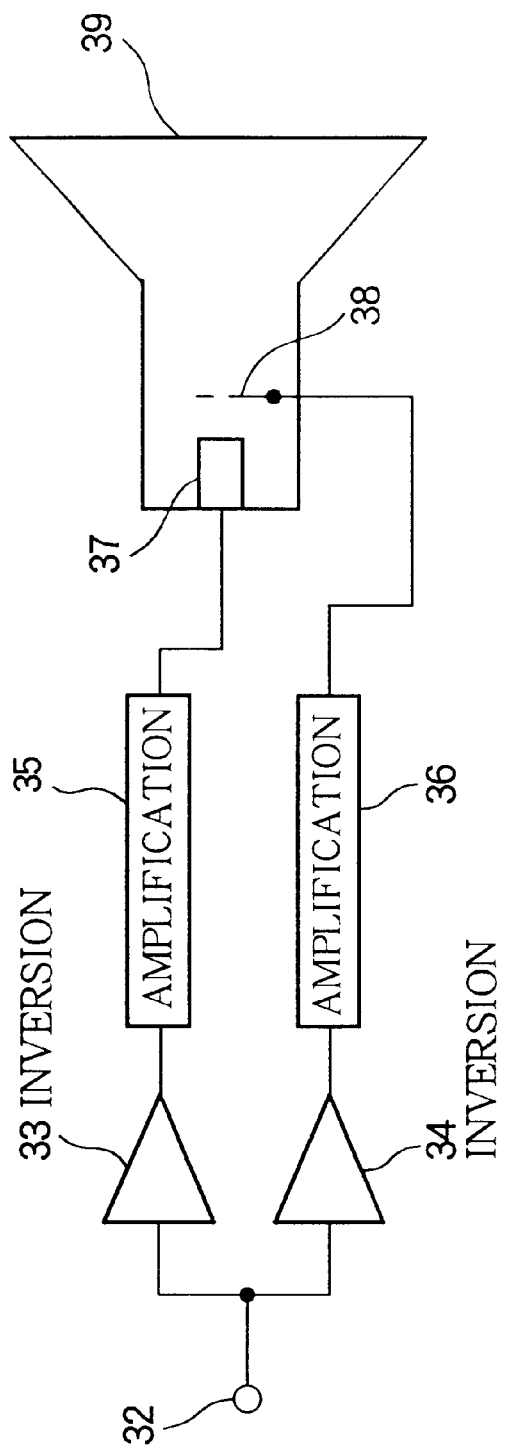
FIG. 8 is a block diagram showing a structure of a video drive circuit of a conventional CRT display apparatus having ability of high-brightness display.
Figure 9:
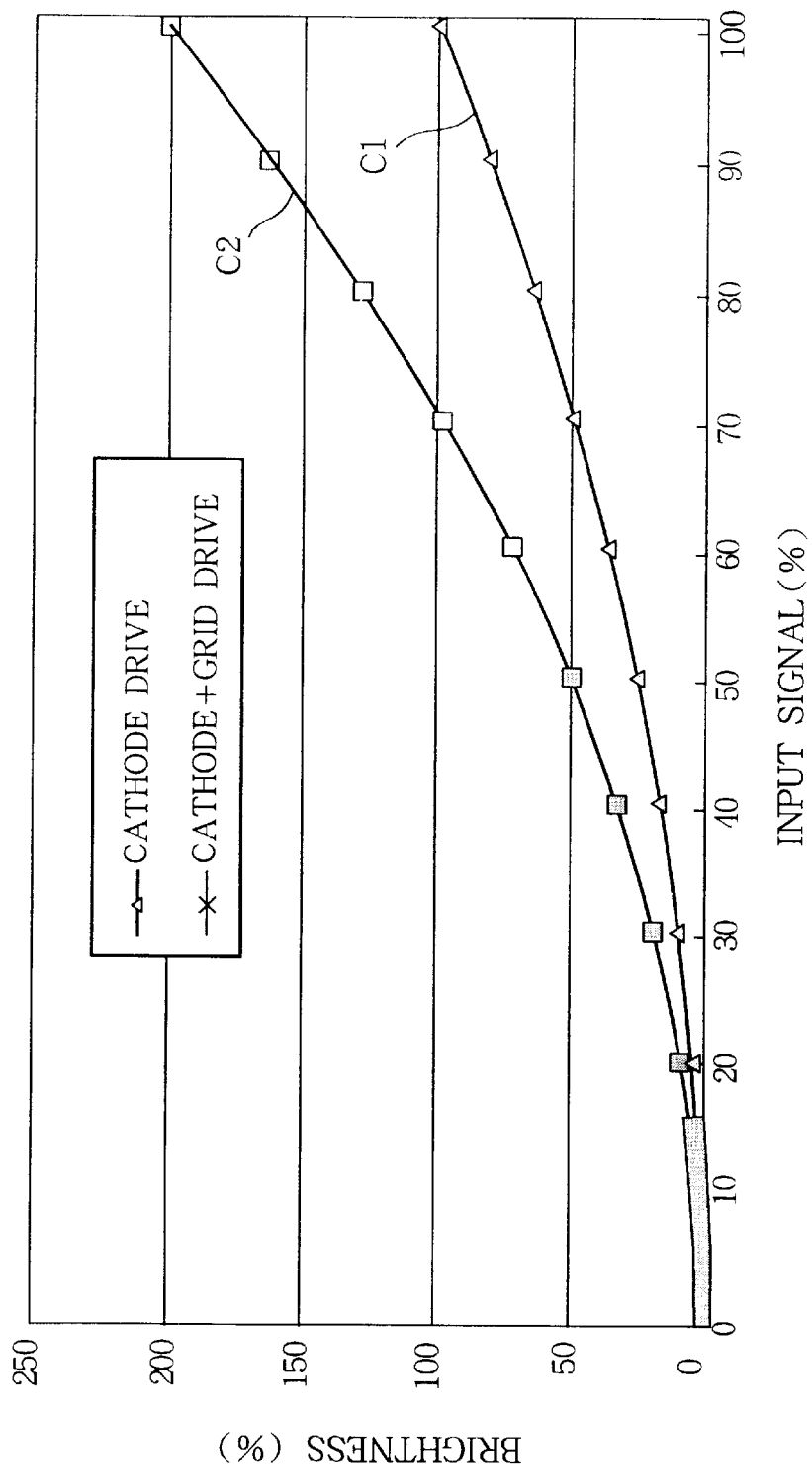
FIG. 9 is a graph showing an input signal amplitude-brightness characteristic of the CRT display apparatus with the video drive circuit of FIG. 8.

FIG. 7 is a block diagram showing a structure of a CRT display apparatus according to a fourth example of the invention. The fourth example differs from the second example in that a frequency-response-degradation suppressing switch 31 is provided between the G-signal input terminal 9 and the G-control signal generation circuit 15.

As shown in FIG. 7, the R-signal input terminal 8 is connected to the input of the R-output amplification circuit 11, and the output of the R-output amplification circuit 11 is connected to the R-cathode electrode 5. The G-signal input terminal 9 is connected to the input of the G-output amplification circuit 12, and the output of the G-output amplification circuit 12 is connected to the G-cathode electrode 6. The B-signal input terminal 10 is connected to the input of the B-output amplification circuit 13, and the output of the B-output amplification circuit 13 is connected to the B-cathode electrode 7.

The G-signal input terminal 9 is also connected to an input terminal of the frequency-response-degradation suppressing switch 31 whose output terminal is connected to the input of the G-control signal generation circuit 15. The output of G-control signal generation circuit 15 is connected to the input of the G-control signal amplification circuit 18. The output of the G-control signal amplification circuit 18 is connected to the first input terminal of the contrast selection circuit 26. The second input terminal of the contrast selection circuit 26 is connected to the normal-contrast effecting potential 27. The output terminal of the contrast selection circuit 26 is connected to the G1 electrode 28.

The operation of the display apparatus according to the fourth example of the invention having the above-described structure will now be described. The R-signal entering the R-output amplification circuit 11 through the R-signal input terminal 8 is amplified, and then supplied to the R-cathode electrode 5. The G-signal entering the G-output amplification circuit 12 through the G-signal input terminal 9 is amplified, and then supplied to the G-cathode electrode 6. The B-signal entering the B-output amplification circuit 13 through the B-signal input terminal 10 is amplified, and then supplied to the B-cathode electrode 7.

The G-signal from the G-signal input terminal 9 is also supplied to the input terminal of the frequency-response-degradation suppressing switch 31. This switch 31 is opened when the normal-contrast-display mode is selected, and closed when the high-contrast-display mode is selected. While the switch 31 is closed, the G-signal is supplied to the G-control signal generation circuit 15.

The G-control signal generation circuit 15 generates a G-control signal by removing, from the G-signal, portions which are below a predetermined level (below 15% of the maximum amplitude, for example). The G-control signal amplification circuit 18 inverts and amplifies this G-control signal. The signal output from the G-control signal amplification circuit 18 is input into the first input terminal of the contrast selection circuit 26.

While the high-contrast-display mode is selected, the contrast selection circuit 26 selects the first input terminal so that the G1 electrode 28 is applied with the signal output from the G-control signal amplification circuit 18. As a result, as well as the above-described examples of the invention, it is possible to display images in high contrast and high brightness without causing noises or halftone-reproduction degradation within dark areas.

While the normal-contrast-display mode is selected and the contrast selection circuit 26 therefore selects the second input terminal, the switch 31 is open. As a result, stray capacitance of the signal line after the switch 31 disappears so that the stray capacitance seen from a not-illustrated video output circuit reduces accordingly, whereby the degradation of the frequency response is suppressed.

In the fourth example of the invention, although the control signal applied to the G1 electrode 28 is generated from the G-signal, it is permissible to generate the control signal from the R-signal or the B-signal. In that case, the frequency-response-degradation suppressing switch 31 is provided between the R-signal input terminal 8 and the R-control signal generation circuit 14 or between the B-signal input terminal 10 and the B-control signal generation circuit 16.

In the above-described first example of the invention, the frequency-response-degradation suppressing switch 31 may be provided between the input terminals of the R-, G-, and B-signals and the R-, G-, and B-control signal generation circuits respectively. In the above-described third example of the invention, the frequency-response-degradation suppressing switch 31 may be provided at the input side of the luminance signal generation circuit 30 or at the input side of the control signal generation circuit 40.

The above explained preferred embodiments are exemplary of the invention of the present application which is described solely by the claims appended below. It should be understood that modifications of the preferred embodiments may be made as would occur to one of skill in the art.

What is claimed is:

1. A display apparatus including a CRT having three cathode electrodes which are applied with an R-video signal, a G-video signal and a B-video signal respectively, and three G1 electrodes provided for the three cathode electrodes comprising:

a control signal generation circuit for generating an R-control signal, a G-control signal and a B-control signal by removing, from each of the R-, G- and B-video signals, portions which are below a predetermined level in amplitude respectively;

a control signal amplification circuit for inverting and amplifying the R-, G- and B-control signals output from the control signal generation circuit; and a selection circuit for selecting, for each of the three G1 electrodes, either a corresponding one of the R-, G- and B-control signals inverted and amplified by the control signal amplification circuit or a potential of a predetermined value in accordance with an instruction from an outside, and applying each of the three G1 electrodes with a selected one of the corresponding one of the R-, G- and B-control signals and the potential.

2. A display apparatus according to claim 1, further comprising a switch for connecting one end of a signal line the other end of which is connected to an input of the control signal generation circuit to an input terminal through which the R-, G- and B-control signals enter, the switch being opened while the selection circuit selects the potential and being closed while the selection circuit selects the R-, G- and B-control signals.

3. A display apparatus including a CRT having three cathode electrodes which are applied with an R-video signal, a G-video signal and a B-video signal respectively, and a common G1 electrode comprising:

a control signal generation circuit for generating a control signal by removing, from one of the R-, G- and B-video signals, portions which are below a predetermined level in amplitude;

a control signal amplification circuit for inverting and amplifying the control signal output from the control signal generation circuit; and a selection circuit for selecting either the control signal inverted and amplified by the control signal amplification circuit or a potential of a predetermined value in accordance with an instruction from an outside, and applying the G1 electrode with a selected one of the control signal and the potential.

4. A display apparatus according to claim 3, further comprising a switch for connecting one end of a signal line the other end of which is connected to an input of the control signal generation circuit to an input terminal through which the one of the R-, G- and B-control signals enters, the switch being opened while the selection circuit selects the potential and being closed while the selection circuit selects the control signal inverted and amplified by the control signal amplification circuit.

5. A display apparatus including a CRT having three cathode electrodes which are applied with an R-video signal, a G-video signal and a B-video signal respectively, and a common G1 electrode comprising:

a luminance signal generation circuit for mixing the R-, G-, and B-video signals in a predetermined ratio to generate a luminance signal;

a control signal generation circuit for generating a control signal by removing, from the luminance signal output from the luminance signal generation circuit, portions which are below a predetermined level in amplitude;

a control signal amplification circuit for inverting and amplifying the control signal output from the control signal generation circuit; and a selection circuit for selecting either the control signal inverted and amplified by the control signal amplification circuit or a potential of a predetermined value in accordance with an instruction from an outside, and applying the G1 electrode with a selected one of the control signal and the potential.

6. A display apparatus according to claim 5, further comprising a switch for connecting one end of each of signal lines the other end of each of which is connected to an input of the luminance signal generation circuit to an input terminal through which one of the R-, G- and B-control signals enters, the switch being opened while the selection circuit selects the potential and being closed while selection circuit selects the control signal inverted and amplified by the control signal amplification circuit.

* * * * *